(12) United States Patent
Bisson

(10) Patent No.: US 9,346,407 B2
(45) Date of Patent: May 24, 2016

(54) SNAP-FIT VEHICLE CONSOLE ASSEMBLY

(71) Applicant: NYX, Inc., Livonia, MI (US)

(72) Inventor: Jeffrey Michael Bisson, Amherstburg (CA)

(73) Assignee: NYX, Inc., Livonia, MI (US)

( * ) Notice: Subject to any disclaimer, the term of this patent is extended or adjusted under 35 U.S.C. 154(b) by 0 days.

(21) Appl. No.: 14/109,993

(22) Filed: Dec. 18, 2013

(65) Prior Publication Data

US 2015/0165980 A1 Jun. 18, 2015

(51) Int. Cl.
*B60R 7/04* (2006.01)
*B21D 53/10* (2006.01)
*B60R 13/00* (2006.01)

(52) U.S. Cl.
CPC . *B60R 7/04* (2013.01); *B21D 53/10* (2013.01); *B60R 13/00* (2013.01); *Y10T 29/49945* (2015.01)

(58) Field of Classification Search
CPC .......... B60R 13/00; B60R 7/04; B21D 53/10; Y10T 29/49945
USPC .............................................. 296/24.34, 37.8
See application file for complete search history.

(56) References Cited

U.S. PATENT DOCUMENTS

| 6,129,400 | A | 10/2000 | Jakubiec et al. | |
|---|---|---|---|---|
| 7,192,070 | B2 * | 3/2007 | Radu et al. | ................. 296/24.34 |
| 7,296,839 | B2 | 11/2007 | Scheerhorn | |
| 8,235,442 | B2 * | 8/2012 | Spitler et al. | ............... 296/24.34 |
| 8,414,048 | B1 | 4/2013 | Kwolek | |
| 2013/0026778 | A1 | 1/2013 | Biggs | |
| 2013/0062899 | A1 | 3/2013 | Stoia | |

FOREIGN PATENT DOCUMENTS

| EP | 0411581 | 2/1991 |
|---|---|---|
| WO | 2008086089 | 7/2008 |

* cited by examiner

*Primary Examiner* — Joseph D Pape
*Assistant Examiner* — Dana Ivey
(74) *Attorney, Agent, or Firm* — Carlson, Gaskey & Olds, P.C.

(57) ABSTRACT

A vehicle console includes a first console member, a second console member and a snap-fit mechanism that secures the first console member and the second console member together in a self-supporting structure. The console members define a portion of a storage compartment.

16 Claims, 3 Drawing Sheets

SNAP-FIT VEHICLE CONSOLE ASSEMBLY

BACKGROUND

Vehicle passenger compartments can include a variety of different interior structures, such as center consoles that are generally located between forward passenger and driver seats of the vehicle. A typical center console is assembled from numerous console components, which may be molded or otherwise individually formed. The console components can be secured together using a heat-stake process and threaded fasteners.

SUMMARY

Disclosed is a vehicle console that includes a first console member, a second console member, and a snap-fit mechanism that secures the first and second console members together in a self-supporting structure such that the first console member and the second console member define a portion of a storage compartment.

In another aspect, a vehicle console includes a hinged lid, a rear panel, a forward/bottom panel, and side panels. The hinged lid, rear panel, forward/bottom panel and side panels includes snap-fit mechanisms that secure the console together in a self-supporting structure such that the hinged lid, rear panel, forward/bottom panel and side panels define an interior storage compartment.

Also disclosed is a method of assembling a vehicle console. The method involves securing together in a self-supporting structure the first console member and the second console member using the snap-fit mechanism.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
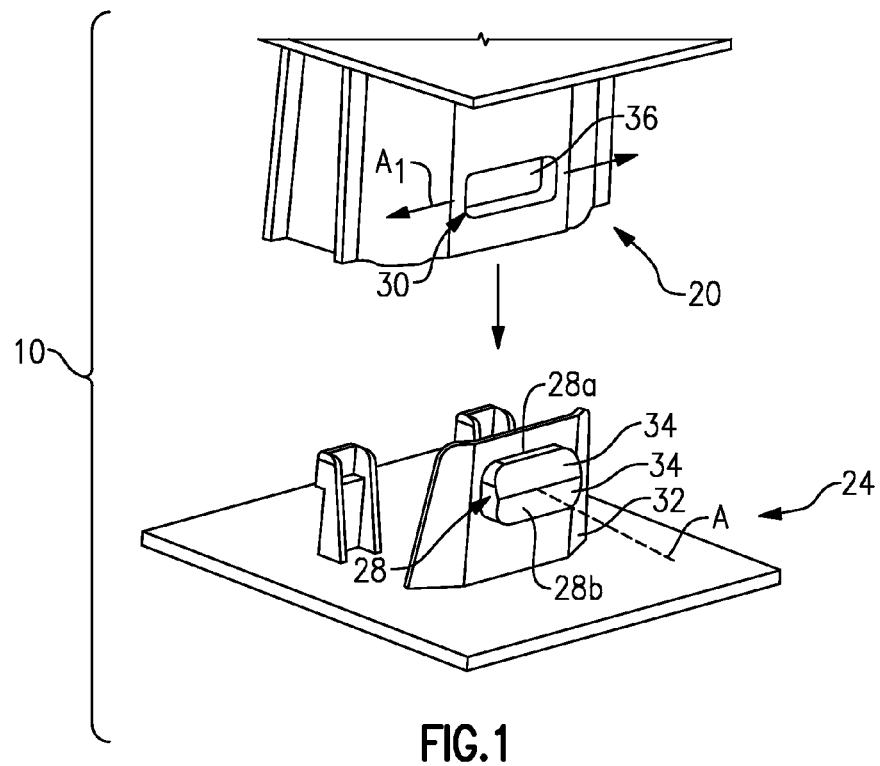
FIG. 1 illustrates an exploded view of two vehicle console members of a vehicle console.
Figure 2:
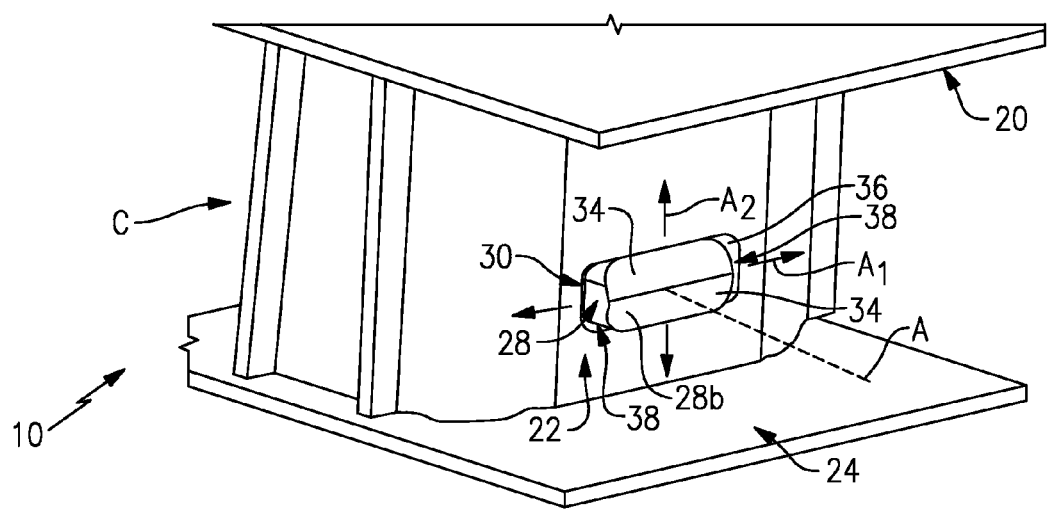
FIG. 2 illustrates an assembled view of the vehicle console members of FIG. 1.

FIG. 1 illustrates an exploded, pre-assembled view of selected portions of a vehicle console 10, and FIG. 2 illustrates a fully assembled view of the vehicle console 10. As will be described in more detail, the vehicle console 10 includes a snap-fit mechanism 22 that is operable to secure a first console member 24 and a second console member 20 together in a self-supporting structure to form at least a portion of a storage compartment (generally designated "C"). The term "self-supporting" means that the connection of the snap-fit mechanism 22 is sufficient for the structure of the first and second consoles 20/24 to support its own weight, without collapsing or falling apart. In some examples, the snap-fit mechanism or mechanisms 22 can be the sole fastening mechanisms of the console 10, although in other examples other fastening mechanisms can be used to supplement the snap-fit mechanism or mechanisms 22.

It is to be understood that the particular geometries of the console members 20/24 are shown somewhat generically in FIGS. 1 and 2 for the convenience of describing the snap-fit mechanism 22. Other embodiments of a vehicle console are later shown with examples of more particular geometries of numerous console members, which may show the snap-fit mechanism 22 of FIGS. 1 and 2 schematically for the convenience of describing the geometries of the console members.

As can be appreciated, the design of the snap-fit mechanism 22 itself can be varied to meet the needs of a particular implementation. In general, a "snap-fit" mechanism will include male and female members that inter-fit and inter-lock. An audible "snapping" sound is not requisite, but may occur. Described below is a non-limiting example of the snap-fit mechanism 22. Referring to FIGS. 1 and 2, the first console member 24 in this example carries a male tab 28 and the second console member 20 carries a female receiver 30. In this example, the male tab 28 is a protrusion that extends from a flange 32 of the first console member 24. In general, the male tab 28 extends from a base 28a to a free end 28b along an axis A. As shown, the axis A is a central axis of the male tab 28. The free end 28b is a faceted, axial end of the male tab 28 and thus includes facets 34. The facets 34 carry generally planer surfaces that are oriented transversely to each other, the function of which will be further described below.

The female receiver 30 of the second console member 20 is an elongated opening 36. The elongated opening 36 is generally elongated along an elongated axis $A_1$. As shown, the elongated opening 36 is completely open and extends through a wall of the second console member 20. However, it is to be understood that the elongated opening 36 could alternatively be a blind elongated opening.

The male tab 28 is also elongated in a direction that is parallel to the elongated axis $A_1$. However, the length of the male tab 28 in the elongated direction $A_1$ is shorter than the length of the elongated opening 36 in the elongated direction $A_1$.

In a fully assembled state, as shown in FIG. 2, the male tab 28 inter-fits with the female receiver 30 such that the male tab 28 extends into the elongated opening 36. In the example shown, the male tab 28 extends completely through the elongated opening 36 along axis A. However, in other examples, the male tab 28 can extend partially into the opening 36 such that the free end 28b is within the elongated opening 36 and does not extend outwardly therefrom.

To assemble the first console member 24 and the second console member 20 together, the console members 20/24 are brought together such that the male tab 28 extends into the female receiver 30. The male tab 28 thus moves in a direction along axis A into and through the elongated opening 36. An initial sliding between the first console member 24 and the second console member 20 may occur along a direction that is transverse to the axis A, to bring the elongated opening 36 and the male tab 28 into axial alignment with respect to axis A. Once aligned, the male tab 28 can move into and through the elongated opening 36 to secure the console members 20/24 together. The faceted surfaces 34 can facilitate the sliding movement and guidance of the male tab 28 into the elongated opening 36.

The male tab 28 inter-fits with the female receiver 30 such that there is play between the first console member 24 and the second console member 20 in a direction along the axis $A_1$ and no play between the console members 20/24 along a second, transverse direction along axis $A_2$. In other words, the top and bottom sides of the male tab 28 in FIG. 2 contact, respectively, the top and bottom sides of the elongated opening 36, and there are respective clearance gaps 38 that flank the left and right sides of the male tab 28. The clearance gaps 38 extend between the male tab 28 and the lateral, left and right sides of the elongated opening 36 in FIG. 2. The lack of play in the direction along the axis $A_2$ facilitates providing a rigid, secure connection between the console members 20/24, while the play provided in the direction along the axis $A_1$ allows the console members 20/24 to accommodate dimensional tolerances in the vehicle console 20. Thus, because of the play provided by the clearance gaps 38, the console members 20/24 can be assembled even if there is some dimensional variation, yet the lack of play in the direction along axis $A_2$ provides a relatively rigid connection to secure the console members 20/24 together.

Figure 3:
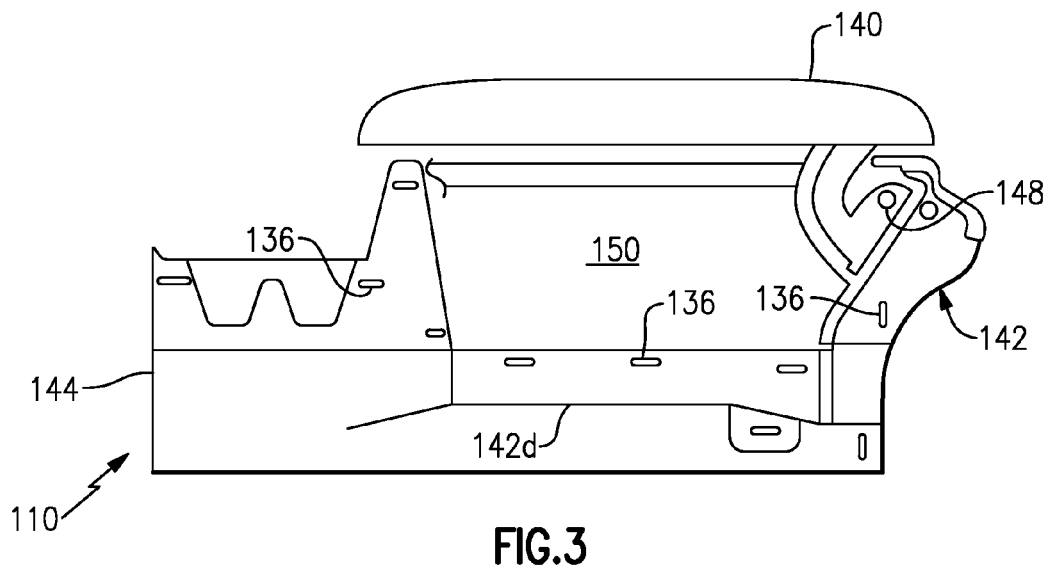
FIG. 3 illustrates portions of another example vehicle console.
Figure 4:
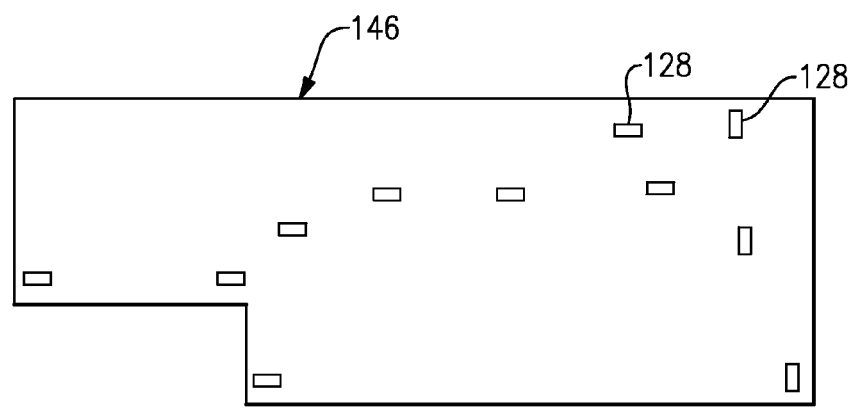
FIG. 4 illustrates a view of a representative side panel of the vehicle console of FIG. 3.

FIG. 3 illustrates selected portions of another example vehicle console 110 that utilizes a plurality of the snap-fit mechanisms 22 described above. In this example, the vehicle console 110 includes a hinged lid 140, a rear panel 142, a forward/bottom panel 144 and side panels 146 (one representative side panel 146 is shown in FIG. 4). The forward/bottom panel 144 in the illustrated example includes cupholders and a latch strike plate. As shown, the hinged lid 140, rear panel 142, forward/bottom panel 144 and side panels 146 include the snap-fit mechanisms (male tabs 128 and female receivers 136, similar to male tabs 28 and female receivers 36 described above). It is to be understood that although specific ones of the components are shown with either the male tabs 128 or the female receivers 136, that alternatively the male tabs 128 and female receivers 136 could be switched.

The hinged lid 140, rear panel 142, forward/bottom panel 144 and side panels 146 are separate and distinct pieces. In other words, the hinged lid 140, rear panel 142, forward/bottom panel 144 and side panels 146 are non-integrally formed and, aside from the snap-fit mechanisms, are not rigidly attached to one another. Once fully assembled together using the snap-fit mechanisms, the hinged lid 140, rear panel 142, forward/bottom panel 144 and side panels 146 are self-supporting and fully enclose an interior storage compartment 150. Moreover, the assembled vehicle console 120 does not require a bin liner for structural support and, thus, reduces the number of console pieces and costs.

Figure 5:
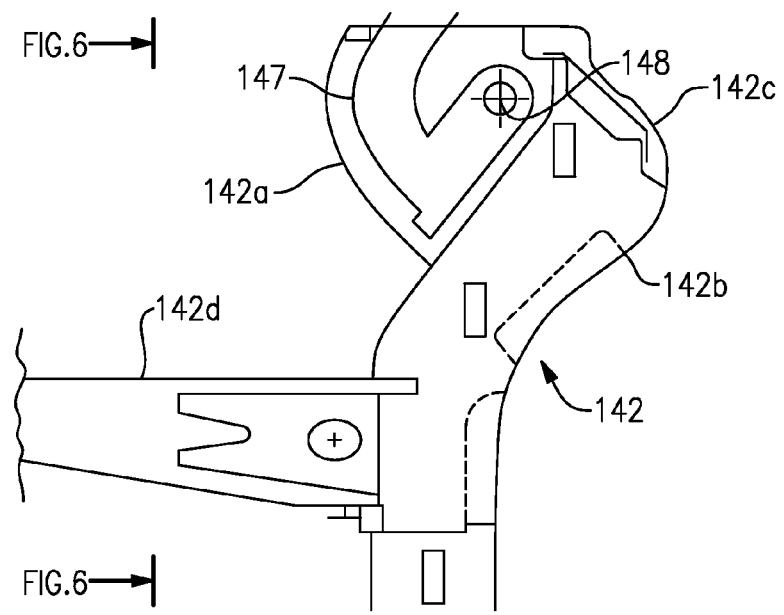
FIG. 5 illustrates an isolated view of a rear panel of the vehicle console of FIG. 3.

FIG. 5 shows an isolated view of the rear panel 142. In this example, the rear panel 142 includes numerous sub-components that can be secured together using similar snap-fit mechanisms as described herein. In this example, the rear panel 142 includes an inner panel 142a, an outer panel 142b, a vent cover 142c, and an air duct 142d. One or more of the sub-components 142a/142b/142c/142d can be integrally formed or attached as a separate and distinct component in the rear panel 142. As shown in FIG. 3, the air duct 142d extends below the storage compartment and facilitates the supporting of the hinged lid 140 and the forward/bottom panel 144.

Figure 6:
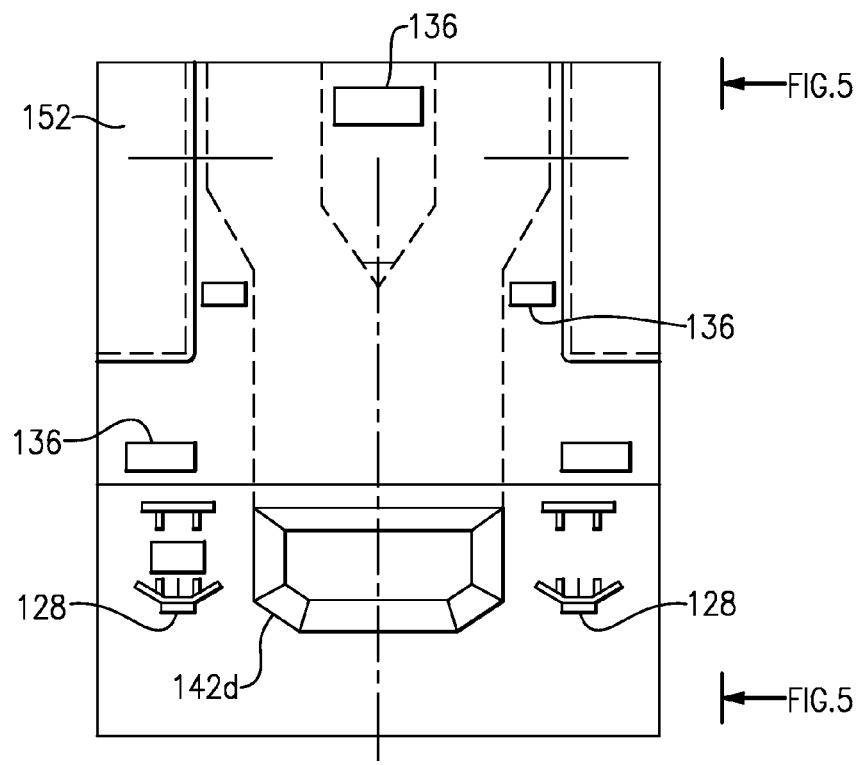
FIG. 6 illustrates another view of the rear panel according to the section line shown in FIG. 5.

FIG. 6 shows a side view of a portion of the rear panel 142. As shown, the rear panel 142 includes numerous male tabs 128 and elongated openings 136 for securing the rear panel 142 to the hinged lid 140, forward/bottom panel 144 and side panels 146. In this example, the rear panel 142 includes a hinge component 147 that cooperates with the hinged lid 140 to provide a hinge connection about pivot point 148. For example, the hinged lid 140 can snap onto and secure to the inner panel 142a at the pivot point 148. As shown in FIG. 6, the rear panel 142 can also include hinge pockets 152, which are recessed areas to accommodate sliding movement of the hinge component 147.

To assemble the vehicle console 120, the hinged lid 140 is snap-fit to the rear panel 142. The term "snap-fit" refers to the insertion of one of the male tabs 128 into the female receiver 136. Prior to assembling the hinged lid 140, the inner panel 142a, outer panel 142b and vent grill 142c are snap-fit together. The assembly of the hinged lid 140 and rear panel 142 is then snap-fit with the forward/bottom panel 144. The side panels 146 can then be snap-fit onto opposed sides of the assembly of the hinged lid 140, rear panel 142 and front/bottom panel 144. The resulting vehicle console 120 thus forms the completely enclosed storage compartment 150 and integral air duct 142d, without the aid of a bin liner, threaded fasteners, heat-staking (material fusing) or the like to form the assembly. The consoles disclosed herein thus can be fully assembled and self-supporting without heat-staking and threaded fasteners. Moreover, the snap-fit mechanism described herein provides a relatively rigid fit between all of the components, yet provides the ability to assemble the components together given dimensional tolerances.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A vehicle console comprising:
a first console member;
a second console member;
a snap-fit mechanism securing the first console member and the second console member together in a self-supporting structure such that the first console member and the second console member define a portion of a storage compartment, the snap-fit mechanism including a male tab carried on the first console member and a female receiver carried on the second console member, the male tab inter-fitting with the female receiver such that there are clearance gaps on opposed sides of the male tab that are bounded by the male tab and sides of the female receiver, the clearance gaps providing play between the male tab of the first console member and the female receiver of the second console member along a first direction and no play between male tab of the first console member and the female receiver of the second console member along a second, transverse direction.

2. The vehicle console as recited in claim 1, wherein the first and second directions are orthogonal.

3. The vehicle console as recited in claim 1, wherein the first and second directions are orthogonal to an axis of insertion of the male tab into the female receiver.

4. The vehicle console as recited in claim 1, wherein the male tab includes a faceted axial end.

5. The vehicle console as recited in claim 1, wherein the female receiver includes an elongated opening.

6. The vehicle console as recited in claim 5, wherein the first direction is collinear with the elongated direction of the elongated opening.

7. The vehicle console as recited in claim 1, wherein one of the first console member or the second console member is a hinged lid.

8. A vehicle console comprising:
 a hinged lid;
 a rear panel;
 a forward/bottom panel; and
 side panels,
  the hinged lid, rear panel, forward/bottom panel and side panels including snap-fit mechanisms securing the hinged lid, rear panel, forward/bottom panel and side panels together in a self-supporting structure such that the hinged lid, rear panel, forward/bottom panel and side panels define an interior storage compartment, the snap-fit mechanisms each including a male tab carried on the first console member and a female receiver carried on the second console member, the male tab inter-fitting with the female receiver such that there are clearance gaps on opposed sides of the male tab that are bounded by the male tab and sides of the female receiver, the clearance gaps providing play between the male tab of the first console member and the female receiver of the second console member along a first direction and no play between male tab of the first console member and the female receiver of the second console member along a second, transverse direction.

9. The vehicle console as recited in claim 8, wherein the hinged lid, rear panel, forward/bottom panel and side panels are separate and distinct pieces.

10. The vehicle console as recited in claim 8, wherein the hinged lid, rear panel, forward/bottom panel and side panels fully enclose the interior storage compartment.

11. The vehicle console as recited in claim 8, wherein the first and second directions are orthogonal to an axis of insertion of the male tab into the female receiver.

12. The vehicle console as recited in claim 8, wherein the male tab includes a faceted axial end.

13. The vehicle console as recited in claim 8, wherein the female receiver includes an elongated opening.

14. The vehicle console as recited in claim 13, wherein the first direction is collinear with the elongated direction of the elongated opening.

15. The vehicle console as recited in claim 8, further comprising an air duct below the storage compartment, the air duct supporting of the hinged lid and the forward/bottom panel.

16. A method of assembling a vehicle console, the method comprising:
  securing together in a self-supporting structure a first console member and a second console member using a snap-fit mechanism such that the first console member and the second console member define a portion of a storage compartment, wherein the securing includes inserting a male tab carried on the first console member into a female receiver carried on the second console member, the male tab inter-fitting with the female receiver such that there are clearance gaps on opposed sides of the male tab that are bounded by the male tab and sides of the female receiver, the clearance gaps providing play between the male tab of the first console member and the female receiver of the second console member along a first direction and no play between male tab of the first console member and the female receiver of the second console member along a second, transverse direction.

* * * * *